Figure 1:
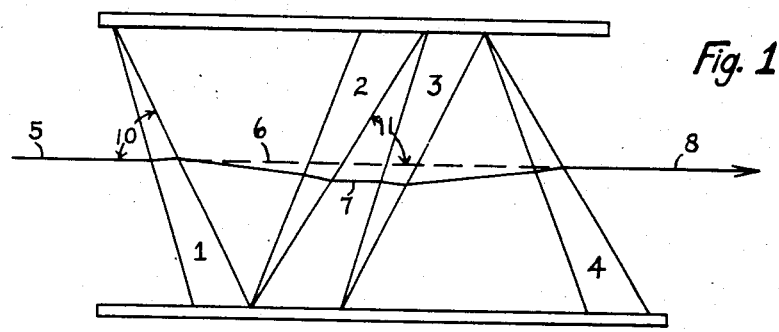

Aug. 3, 1937.                H. S. NEWCOMER                2,088,660
                      ANAMORPHOSING OPTICAL SYSTEM
                          Filed Oct. 23, 1933

INVENTOR
Harry S. Newcomer
BY
Hammond & Littell
ATTORNEY

Patented Aug. 3, 1937

2,088,660

UNITED STATES PATENT OFFICE 2,088,660

ANAMORPHOSING OPTICAL SYSTEM

Harry Sidney Newcomer, New York, N. Y.

Application October 23, 1933, Serial No. 694,803

25 Claims. (Cl. 88—1)

This invention relates to photographic objectives and more particularly to anamorphosing prism objectives of the type used for taking and projecting motion pictures and in the projection of printed matter such as stock quotations and financial news and the reduction printing of sound track.

Anamorphosing prism objectives of this character are used in front of ordinary projection (or photographic) objectives to form an optical system producing images which are magnified (or compressed) more in one diameter or meridian than in a diameter perpendicular thereto. For convenience of description the anamorphosing objectives to be described will be treated as for use with a projection objective to expand the projected images in one meridian called its "active plane", and the expansion end of the anamorphoser will be termed "the front". This invention is in the nature of an improvement over certain of the features disclosed in Patent No. 1,931,992 for Anamorphosing prism objective, granted to me October 24, 1933 and Patent No. 1,898,787 for a Prism anamorphoser granted to me February 21, 1933. In the Patent No. 1,931,992, there is disclosed an anamorphosing prism objective so corrected that there is an approximate equality of distortion or variation in magnification on the two sides of an optical axis of the system, the optical axis being an axis in which there is no angular deviation of a ray after traversing the objective. This axis or axial plane can be called an optical axial plane of the objective. An objective wherein the optical axis coincides with or is parallel to the axis of the system is a straight vision objective and an objective which gives approximately equal magnifications for equal moderate angles of inclination to a plane is said to be equilateral with respect to the said plane.

In the Patent No. 1,898,787, there are disclosed features whereby the correction of a certain pillow case distortion is obtained. This is accomplished by so mounting the prisms that the optical axial plane of the objective is tipped or inclined to the axis of the system as a whole. Such a tipped objective is no longer a straight vision objective, that is to say, axial rays of the system suffer angular deviation when they pass through the objective.

The patent above discloses prism objectives which are straight vision and equilateral with respect to the axial plane, and which are mechanically tipped so as to be non-straight vision, but still equilateral with respect to the optical axial plane and not with respect to the axial plane, and which are "optically" tipped so as to remain equilateral with respect to the axial plane while being nevertheless non-straight vision. The patent also discloses means for achromatizing said objectives, either each prism separately, or the objective as a whole by what might be called cross achromatization wherein the two prisms are composed of single glasses of appropriately different dispersive qualities. All of said prism objectives consist of two prisms with their bases oppositely disposed, in which because of the equilateral or approximately equilateral character of the anamorphosis with respect to an optical axial or axial plane, each member of the oppositely disposed pair of prisms takes an appreciable part in the anamorphosis.

Broadly considered, the above two classes of prism objectives, for the second is only a different orientation of the first in which provision for achromatization may or may not be made, provide, by suitable orientation of one of them with respect to an axis, all of the following types of prism objectives; namely, straight vision and equilateral, straight vision and non-equilateral, equilateral and non-straight vision, non-equilateral and non-straight vision. The latter may or may not be equilateral with respect to the optical axial plane.

The Patent 1,898,787 discloses means for varying the angle between the equilateral plane and the optical axial plane and for varying the achromatization so as to achromatize along any particular axis. For any particular magnification, variation in the angle between the optical axial plane and the equilateral plane will provide an objective in which the qualities exemplified in the above types are present to any desired degree.

Anamorphosing prism objectives which are designed to be equilateral with respect to an axis, for example with respect to the optical axial plane are usually made equilateral or approximately equilateral primarily for angles approximating the maximum angles at which they are expected to be used. At larger angles they become increasingly non-equilateral.

The present invention has for its principal objects increase in permissible magnification, the reduction of pillow case distortion, the reduction of the inequality of magnification for rays entering at different angles and the reduction of the increase in magnification which occurs as the working angle of the prism anamorphoser, that is, the angular opening of the pencils traversing the anamorphoser, is increased. It is one of the advantages of the invention that the axial ray traversing the objective suffers relatively little lateral displacement, and can, if desired, be made to suffer no displacement as compared with a two-prism objective in which there is considerable lateral displacement of axial rays.

This invention has as a further object to provide a simple color correction for such an improved anamorphosing prism objective and to provide an objective which while incorporating the desired corrections is of simple design and can be economically produced.

A further advantage of the invention is that it permits the construction of anamorphosing prism objectives in which the angles of inclination of the prisms are substantially less than in the case of two prism objectives of like magnification.

The several objects above indicated are accomplished in part by dividing the required magnification between two units or prism sets and so arranging the units that certain distortion and irregularities unavoidably introduced by each unit partially or wholly neutralize each other. The ability to reduce distortion and avoid lateral displacement of traversing pencils due to prism anamorphosers is also enhanced by the substitution of a single prism for the two adjacent prisms of such a combination, that is by means of a three prism anamorphoser, the front and back prisms of which have their bases to one side of the axis and the middle prism its base to the opposite side, the latter prism being the strongest of the three.

The nature and objects of the invention will be better understood from the description of selected illustrative embodiments thereof, for the purpose of which description reference should be had to the accompanying drawing forming a part hereof and in which—

Figure 2:
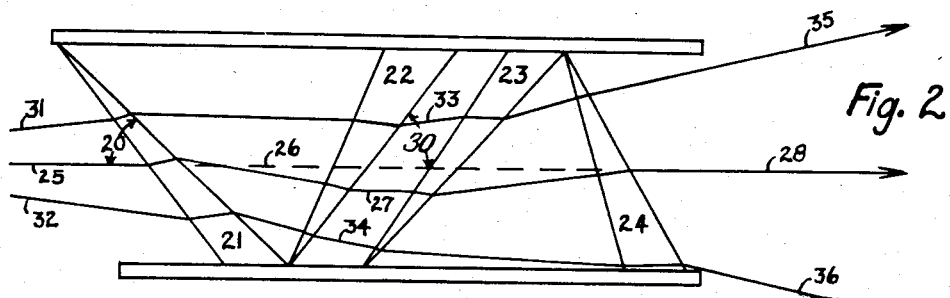
Figures 3, 5:
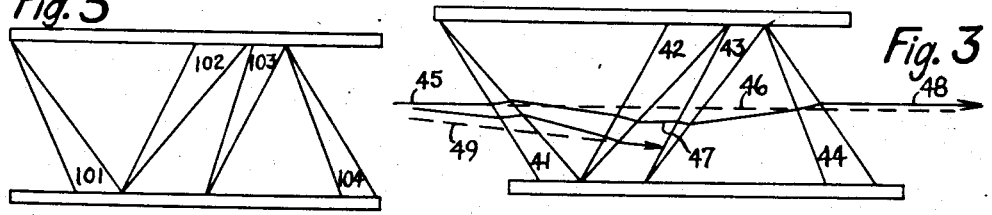
Figure 4:
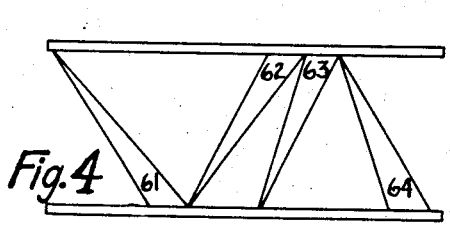
Figure 7:
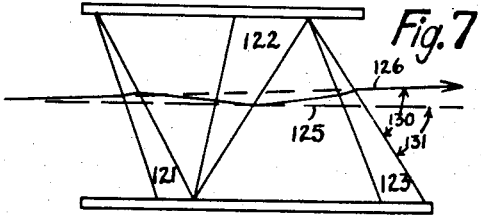
Figure 6:
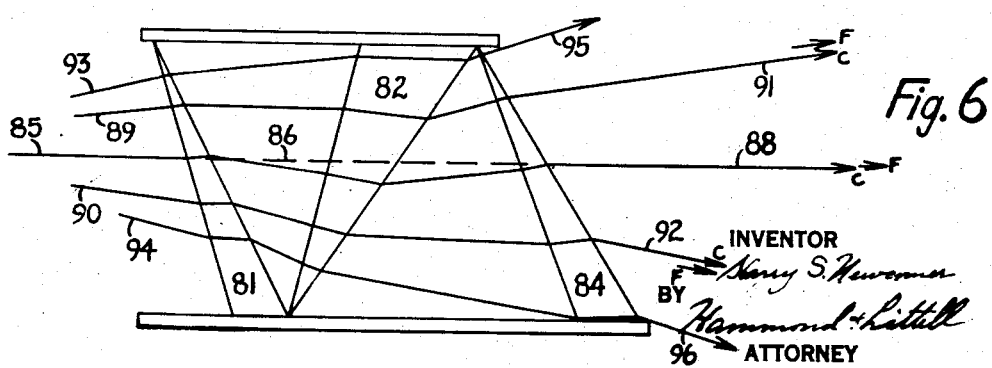

Figure 1 is a diagrammatic representation in longitudinal section of a prism objective comprising two achromatic equilateral anamorphosing straight vision prism sets placed one in front of the other in reversed position but with their active planes parallel, Fig. 2 is a diagrammatic representation in longitudinal section of a prism objective comprising two non-equilateral anamorphosing straight vision prism sets placed front to back in reversed position but with their active planes parallel, Fig. 3 is a diagrammatic representation in longitudinal section of a prism objective comprising two non-straight vision equilateral prism sets placed front to back in reversed position but with their active planes parallel, Fig. 4 is a diagrammatic representation in longitudinal section of a prism objective comprising two non-straight vision non-equilateral prism sets placed front to back in reversed position but with their active planes parallel, Fig. 5 is a diagrammatic representation in longitudinal section of another four prism objective embodying certain features of the invention, Fig. 6 is a diagrammatic representation in longitudinal section of an achromatic equilateral straight vision three prism objective embodying features of the invention, and Fig. 7 is an objective with its optical axial plane tipped.

In the drawing are shown illustrative prism anamorphosers wherein in each of several instances the anamorphoser consists of two anamorphoser units or prism sets one in front of the other and so arranged that distortional effects of the one prism set are at least in part neutralized by those of the other.

In the illustrative structure, wherein the anamorphoser consists of two anamorphoser units, each unit comprises two prisms having their bases oppositely arranged, one prism having its front face inclined to the axis of the objective at a predetermined angle in one direction and the other prism having its front face inclined to the axis of the objective in the opposite direction whereby the two prisms form a V.

In each anamorphoser the total magnification is divided between the two units and these units are so arranged that in part the distortional effects of one neutralize the distortional effects of the other and in part inequalities due to the unsymmetrical character of two prism anamorphosers are made symmetrical and smaller by the combination of oppositely disposed less strong units. That is to say the two units are arranged with the angle of the V lying to opposite sides of the axial plane.

In general the two units are of essentially similar type, that is to say, if one unit is an equilateral and/or a straight vision prism set, the other should also be. If one unit is mounted with its optical axial plane inclined at an angle to the axis of the mounting in one direction, the other unit should be mounted with its optical axial plane at a corresponding suitable inclination but in the opposite direction, a difference between the two existing only because of the deviation effect upon an inclined optical axial ray of the first set by the second set. An inclined ray, entering the back of a prism set, is deviated more than an axial ray and hence with equality of optical or mechanical tipping and magnification the front set would over correct the tipping of the optical axial ray of the back set. The same consideration holds true in establishing a balance between non-equilateral sets.

For the purpose of simplifying the description as well as to illustrate different typical embodiments of the invention there are shown in the drawing combinations of prism sets of different types which illustrate separately the neutralization of distortions of different types. The objective shown in Fig. 1 comprises two units each a straight vision and equilateral unit, each similar to the objective of Fig. 2 of the Patent 1,898,787, wherein the lateral displacements of substantially axial rays by the two units neutralize each other to provide an objective in which a ray entering the objective in the axial plane of the objective will also exit in the same plane and with respect to both principal meridians; the objective of Fig. 2 comprises two non-equilateral straight vision units as would result from a suitable orientation of objectives of the type shown in Fig. 7 of the above patent, wherein the distortions due to the non-equilateral feature substantially balance each other; the objective of Fig. 3 comprises two equilateral units, type Fig. 7 of the above patent, in which the optical axial plane is in each case inclined to the axis of the mounting, the angle of inclination being such that the angular distortions of the two sets neutralize each other whereby a ray entering on the optical axial plane on the axis of the objective will exit on that axis or parallel thereto. In Fig. 4 there are combined two non-equilateral, non-straight vision objectives as would result from a suitable orientation of objectives, either both of type Fig. 7 of the Patent 1,898,787 or one type Fig. 7 and one type Fig. 2, the pair having each such angles between the optical axial plane and the equilateral plane and the axis as to neutralize both types of distortion simultaneously. The objective of Fig. 5 comprises two equilateral straight vision units each similar to the objective of Fig. 2 of the same patent, wherein the front unit is weaker than the back unit thereby embodying in part certain features of the invention. Fig. 6 illustrates an objective combining two prism sets in which the two adjacent prisms of the front and back sets are combined in one piece of glass to form one prism. This objective, therefore, while consisting of two prism sets as in the case of the other objectives illustrated may properly be termed a three prism objective. While it is not a necessary feature of the invention there are certain advantages in making each prism set achromatic, whether or not each prism is separately achromatized. In the three prism objective of Fig. 7 the optical axial plane of the objective is tipped with respect to the axis.

Referring more particularly to the drawing, in Fig. 1 there is shown diagrammatically an achromatic anamorphosing prism objective comprising prisms 1, 2, 3 and 4 in which the prisms 1, 2 constitute one anamorphosing straight vision unit or prism set and the prisms 3, 4 constitute another similar but reversely arranged unit.

The ray 5 entering in the optical axial plane 6, after traversing the prisms 1 and 2 emerges at 7 parallel to the optical axial plane 6, and after traversing the prisms 3 and 4 it emerges at 8 again in the optical axial plane. The prism set 1, 2 is identical with the prism set 3, 4 and therefore the displacement of the axial ray by each is the same provided the height of the optical axial plane is suitably chosen. Latitude in this selection also permits latitude in the identity of the two prism sets with coincidence of the emerging ray with the axial plane nevertheless retained. Although these two prism sets are drawn as identical such identity is not necessary in prism sets embodying the invention. The prism set 3, 4 might have been constructed of prisms of different strength and different inclinations than prism set 1, 2. The magnification produced by the set 3, 4 need not equal that produced by the set 1, 2, although roughly approximate equality improves the quality of the resultant combination for certain purposes.

Prism sets 1, 2 and 3, 4 may be designed in accordance with the principles outlined in Patent No. 1,931,992 or Patent No. 1,898,787, above mentioned; for example, the front prism 2 of the set 1, 2 may be stronger but not more than 25% stronger and the two prisms may be so tipped that the front face of the back prism 1 makes an angle 10 with the axis 6 that is greater but not more than 12° greater than the angle 11 of the front face of the front prism 2 with the axis 6.

The limits stated are, of course, not absolute since it is possible to construct good prism sets in which the difference in strength or the relative angles of tipping are outside of these limits but, in general, if the requirements are critical the relations of the prisms should be as indicated, except that the strengths are often best when nearly equal or the front prism of each unit slightly weaker than the back one.

Each prism set may be achromatized and ordinarily should be either by the method of achromatizing each prism separately as discussed in said patents, or by choosing the Abbé numbers of the separate prisms to provide achromatization of each set as a whole, although it is possible to achromatize the objective as a whole without making either prism set achromatic.

In Fig. 2 is shown diagrammatically an anamorphosing prism objective magnifying about 2 comprising four prisms 21, 22, 23 and 24 in which each prism set is a straight vision non-equilateral set, wherein the front prism 22 of the set 21, 22 may be, instead of less than 25% stronger than the prism 21, as much as 80% or more stronger, being from 45 to 65% stronger for 5° tipping angle of the optical axial plane with respect to the equilateral plane, and wherein the angle 20 of the front face of the back prism 21 with the optical axial plane 26 may be as much as 16° or more less than the angle 30 of the front face of the front prism 22 with the optical axial plane, and similarly for the prism set 23, 24. Or in each instance the reverse may be true, thereby to displace the optical axial plane to the other side of the equilateral plane. The ray 25 entering in the optical axial plane 26, after traversing prisms 21 and 22 emerges at 27 parallel to the optical axial plane 26, and after traversing the prisms 23 and 24 it emerges at 28 parallel to the optical axial plane. The two prism sets 21, 22 and 23, 24 may be so chosen or constructed or the height of the optical axial plane so selected that the ray at 28 lies in the optical axial plane 26. If the two prism sets 21, 22 and 23, 24 are identical and at the same time non-equilateral then the second prism set does not entirely correct the non-equilateral feature of the first prism set, the difference in magnification or inclination for rays inclined to the two sides of the optical axial plane after emergence from set 21, 22 being magnified as well as balanced by the set 23, 24. In any case it is possible to neutralize the non-equilateral feature of the first prism set by the introduction of a suitable amount of non-equilateralism in the second prism set, that is by relatively increasing the angle between the optical axial and equilateral planes or/and by decreasing the magnification of the front set. The neutralization of distortions due to the non-equilateral quality may be better effected if the prism sets are particularly selected as to these angles with this feature in mind, but the optimum quality in other respects may indicate a compromise. The non-equilateral magnification of prism sets of different strengths and of different character may be tabulated or represented by analytical plots to facilitate selection. In the figure the rays 31 and 32 entering the prism 21 at equal but oppositely directed angles to the axial plane 26 exit from the prism 22 at 33 and 34 respectively, the ray 34 being at a greater angle to the axial plane than is 33 (shown exaggerated for clarity). This inequality is neutralized by the set 23, 24 so that the rays 35 and 36 exiting from the prism 24 are equally inclined to the axial plane. The magnification produced by the set 23, 24 need not equal that produced by the set 21, 22 although roughly approximate equality improves the quality of the resultant combination for certain purposes.

In making the selection it should be noted that the maximum angles of rays entering the back unit in the active plane will be determined by the optical system and the maximum angles of rays entering the front unit will be greater in proportion to the strength of the back unit. If the two units are so chosen that the differences of inclination at exit for the most oblique effective rays entering the back unit are suitably neutralized by the differences of deviation for these same rays when entering the front unit at greater obliquity the neutralization for rays at intermediate angles will ordinarily be acceptable without more tedious but perfectly possible analysis.

In Fig. 3 is shown an achromatic anamorphosing prism objective comprising four prisms 41, 42, 43 and 44 forming two approximately equilateral sets, the optical axial planes of which are tipped relative to the optical axis of the system. If such tipped units are designed as described in the Patent 1,898,787 so as to individually give optimum correction for pillow case distortion, then the combination also has such distortion considerably reduced. The amount of such tipping of the optical axial plane of each unit necessary to produce optimum result is proportional to the strength of the unit, about 1° for each 9% of magnification. This principle can be used to improve the design of various derived combinations. Fig. 3 shows the combination of two such suitably tipped units. The front set 43, 44 is weaker than the back set. The back set 41, 42 has its optical axial plane 49 tipped so as to cause the angle which this plane makes with the front face of the front prism 42 of the set to be greater than the angle of this face to the axis. The same tipping of the optical axial plane holds for the front set 43, 44.

These are prism sets of the same type as in Fig. 2, but they have their optical axial planes rather than their equilateral planes tipped with respect to the axis. They are differently oriented. The ray 45 entering the prism 41 in the optical axial plane 46 of the combination but not in the optical axial plane 49 of the set 41, 42, after traversing the prisms 41 and 42 emerges at 47 no longer parallel to the optical axial plane 46 but after traversing prisms 43, 44, it emerges at 48 parallel to the optical axial plane. The prism set 41, 42 is different from the prism set 43, 44, for otherwise the axial ray once deviated by the first prism set could not be made axial by the second. The magnification effect of the second prism set would result in a residual deviation. The sets 41, 42 and 43, 44 are approximately equilateral. The combination is, therefore, approximately equilateral. The magnification produced by the set 43, 44 may not be required to be equal to that produced by the set 41, 42, although an approximate equality improves the quality for certain purposes of the resultant combination. Fig. 3 illustrates the manner in which two non-straight vision prism sets may be combined to make a straight vision objective. My Patent No. 1,898,787, above mentioned, outlines the principles to be considered in the construction of the equilateral non-straight vision prism sets of the type which may be used in this arrangement. As there indicated, the prisms may be so mounted that the optical axial plane of the unit is inclined to the axis of the system, but whereas an angle of between 3° and 7° is therein indicated as usually offering optimum quality, the conditions involved when combining one non-equilateral prism set with another to provide neutralization of distortions obviously may indicate a different optimum angle. For example, with suitable tables or plots showing the magnifications and distortions of prism sets within the range of those desired two sets may be selected wherein the non-equilateral quality of each is more or less than the above and in the combination is neutralized. A compromise may often be acceptable wherein the objective is not exactly straight vision but other distortions are satisfactorily eliminated.

In Fig. 4 is shown an objective of the type above indicated comprising four prisms, 61, 62, 63 and 64 of which each prism set is both non-straight vision and non-equilateral but so selected that the objective as a whole is both straight vision and equilateral as the result of neutralization. In Fig. 4 each unit 61, 62 and 63, 64 combines the non-straight vision characteristics of the units of Fig. 3 and the non-equilateral characteristics of the units of Fig. 2. In other words the units of Figs. 4, 3 and 2 are all of the same type, but differently oriented or tipped with respect to the axial plane. For each unit the angle between the optical axial plane and the equilateral plane is such as to bring about neutralization of the angular deviation of axial rays and unequality of deviation of oblique rays, by the other. The axial plane may lie either between the optical axial and equilateral planes or to one side or the other of both of them.

All of these objectives are such that lateral displacement of axial rays may be obviated and pillow case distortion reduced. The latter may be still further reduced by tipping the objective or the optical axis plane slightly, a degree or two, in such a direction as to make the angle between the optical axial plane and the front face of the front prism greater than between the axis and the front face of the front prism. The direction of such tipping is shown in Fig. 7 at 126, 130; 125, 131. It will be obvious from the foregoing that this may be accomplished, either by tipping the objective bodily as a whole or by mechanically or optically tipping the one or the other unit thereof, or both. To be particular the front prism of the front unit may be made relatively still stronger than the back prism of the front unit and the front face of the front prism may be positioned at a less different angle or even a greater angle to the axis than the front face of the back prism of the front unit, thus to optically tip the optical axial plane of this unit in the proper direction as in the case of optically tipped objectives of the Patent 1,898,787. Or both units may be modified to produce the effect.

I have discovered that a reduction of pillow case distortion can also be accomplished by forming the four prism objective, as in Fig. 5, of two units 101, 102 and 103, 104 of unequal magnification constants, the back unit 101, 102 being the stronger. These units may be both equilateral and straight vision. The anamorphoser of Fig. 3 also embodies this advantage, the front unit being weaker than the back unit. In Fig. 3 each unit is also optically tipped to reduce this distortion.

As a further feature of the invention I have discovered that it is possible to replace the two middle prisms of a four-prism set by a single prism having an approximately equal strength and placed at the same average inclination.

Fig. 1 shows a four prism anamorphoser comprising the prisms 1, 2, 3 and 4. Fig. 6 shows an equivalent three prism anamorphoser comprising the prisms 81, 82, 84 in which the intermediate prism is substantially the equivalent of the two intermediate prisms of the anamorphoser of Fig. 1 and the front and back prisms are of the same strength and inclination as those of Fig. 1, each inclined to the optical axial plane as in the primitive prism set so as to take an appreciable part in the anamorphosis. The dispersions of these front and back prisms Figures 1 and 6 are also identical, that is the two front prisms are alike and the two back prisms are alike, in each objective cross achromatization being obtained. The dispersion of the middle prism of the achromatic objective of Fig. 6 is intermediate between the other two.

The prism set shown in Fig. 6 has the following constants—

| | Apex angle | Angle between the front face and optical axial plane | Index of refraction for the ray C | Abbé number |
|---|---|---|---|---|
| Prism 81 | 10° | 63° | 1.58619 | 61.2 |
| Prism 82 | 20.10° | 55.71° | 1.58014 | 59.3 |
| Prism 84 | 10.57° | 57.95° | 1.56947 | 57.5 |

It is not necessary that the prisms be made of glasses of high refractive indices. The three prism anamorphoser having the following constants has the same magnification value and achromatization as the unit of Fig. 6 tabulated just above—

| | Apex angle | Angle between the front face and optical axial plane | Index of refraction for the ray C | Abbé number |
|---|---|---|---|---|
| Prism 81 | 11.35° | 62.325° | 1.51382 | 63.9 |
| Prism 82 | 20.85° | 55.335° | 1.55780 | 60.7 |
| Prism 84 | 11.20° | 57.64° | 1.53720 | 59.6 |

I have further found that the making of a prism set (or three prism anamorphoser) straight vision and equilateral, or approximately so is facilitated if the angle of inclination of the front face of the front prism (at the expansion end) to the optical axial plane is made not much different and preferably not greater than the angle of inclination of the front face of the back prism to the same plane.

The three-prism set shown in Fig. 6 is approximately achromatic the dispersions between the C and F rays being indicated in quality and magnitude roughly by the arrows on the drawing. The magnitude of the dispersion for the rays 91, 88 and 92 is 55.21, 2.3 and 51.55 thousandths of a degree, respectively. Obviously the achromatization of the three-prism objective offers a new difficulty. This problem may be solved by achromatizing each prism separately or by cross achromatization between the three prisms. I have found that in order to produce such cross achromatization most effectively the $\nu$ (Greek nu) or Abbé numbers of the three prisms should all be large and should decrease in size from the back to the front prism, the Abbé number of middle prism lying between the other two in value. Also, the middle prism should be inclined at approximately the same or a smaller angle to the same plane, and should have roughly twice the strength of the front prism. The front and back prisms should not be greatly different in strength.

The individual units of the objective of Fig. 1 are identical and each magnify about 1.20, the combination about 1.45. The $\nu$ difference for the two glasses is about 4 (one unit for each 5% magnification). Actually it is 3.7, the front prism having the smaller $\nu$. The proper $\nu$ difference for cross achromatization of two prism anamorphosers of different strengths and comprising prisms of different strengths is fully disclosed in the Patent 1,898,787. The amount of the $\nu$ difference necessary to achromatize the anamorphoser along an optical axial plane decreases proportionately with decrease in magnification being zero at zero magnification. The difference is thus about one unit for every 5% of magnification. It also varies slightly in proportion to the strength of the prisms comprising an anamorphoser of any given magnification constant. For straight vision equilateral anamorphosers producing magnification of 45% (magnification ratio 1.45 to 1) as here illustrated the $\nu$ difference necessary to achromatize the anamorphoser along the optical axial plane is approximately equal to 6.6 plus one third the number of degrees minimum deviation angle of the back prism.

The amount of the dispersion when it is zero along the optical axial plane, increases with increasing angles, in either direction, of the ray to the plane. It is of opposite character in the two directions. The amount of the increase for every degree change in inclination of the pencil at the compression end of the objective is about twice that due to unit constringence difference variation mentioned above. The increment of chromatic difference per degree of inclination difference is approximately equal to 0.00075° for every 5% of magnification produced by the anamorphoser.

For these anamorphosers magnifying 45% the decrease in $\nu$ difference from the optimum for achromatization along the optical axial plane in order to obtain achromatization along some other ray amounts to approximately 2 units per degree inclination of the said ray at the compression end to the optical axial plane (inclination being taken in the direction of the equilateral axis). This amounts to 0.22 unit per degree and 5% of magnification, and being in most instances opposite in sign to the $\nu$ difference for optical axial correction, it tends to neutralize or reverse this difference when algebraically added to it. I have discovered that the outside prisms of a cross achromatized three prism anamorphoser must have substantially the same $\nu$ difference as if they belonged to an achromatic two prism anamorphoser with magnification constant the square root of that of the three prism anamorphoser. The other prism of the achromatic three prism anamorphoser should then have a $\nu$ intermediate between the other two. The $\nu$ difference of the outside glasses necessary to accomplish cross achromatization is therefore about one unit for each twentieth above unity of the square root of the magnification constant when the latter is expressed as a factor. Thus 45% magnification implies a magnification constant of 1.45 whose square root is 1.204.

The ray 85, Fig. 6, entering in the optical plane 86, after traversing the prisms 81, 82 and 84 emerges at 88 parallel to and close to the optical axial plane 86. By suitable disposition of the prisms, and selection of their thicknesses without changing their angles or inclinations, that is by choosing a suitable height of incidence, the axial ray can be made to emerge still in the same axial plane if desired. At 89 and 90, I have shown two rays inclined 6½° to the optical axial plane, up and down respectively and exiting from the objective at its other end as the rays 91 and 92, respectively. The residual dispersion, and the direction thereof, of the exiting rays is indicated by arrows and the letters C and F, and their relative positions. At 93 and 94, I show two rays inclined 13° to the axis, up and down respectively, and exiting at the other end as the rays 95 and 96.

By the present invention, as above indicated, it is possible to reduce the disproportionate increase in angular deviation with increase in angle of inclination of incident rays to the optical axial plane; in other words to reduce the distortion due to increased magnification with increasing angles of incidence, by combining two two-prism sets to form one four-prism set, Figs. 1 to 5 indicating illustrative examples of such combinations. A similar improvement obtains in the three-prism set of Fig. 6.

In order to obtain any given magnification for the objective the individual two-prism sets need only a relatively small magnification, a magnification such that the product gives the result in magnification desired, thus if the magnification of 1.44 is to be obtained the individual prism sets may have magnification of 1.20 each, or they may be different from each other.

I have discovered that the combinations described not only have improvement in the equality of magnification and equilateral feature but there is also less pillow case distortion than with two-prism sets.

It is, of course, possible, as disclosed in the patents for two prism anamorphosers, to increase the strength of the prisms and thereby also their angles of inclination to the axis, thus making the anamorphoser more compact. The three prism anamorphoser conforms in this respect to the units of the four prism anamorphoser.

In each unit, as described in the patents, each prism is inclined and placed in reversed position so that the markedly non-equilateral character of the magnification due to any single inclined prism is in large part neutralized or corrected for by the choice of inclination and strength of the second prism, it being tipped, because of its reversed position, in the opposite direction so as to also take a substantial part in the anamorphosis or magnification.

In the Patent 1,931,992 there are given angles of inclination to the axis of prisms of straight vision prism anamorphosers having equilateral characteristics, as well as means for decreasing the strength of said anamorphosers by rotating the prisms together and increasing their proximity to the vertical. In so doing it is shown, however, that the anamorphoser becomes more and more non-equilateral, and with a displacement of the equilateral plane away from the axial and optical axial plane. In the Patent 1,898,787 is given means for shifting the equilateral plane of such a prism set toward the axial or the optical axial plane, means which consists in decreasing the strength of the front prism and increasing its inclination from the vertical. Or it could be tipped bodily so as to bring the equilateral plane toward, and the optical axial plane away from, the axis and thus accomplish the desired result of reducing pillow case distortion. In either case the front prism has a preferred position further inclined from the vertical than would be had as a result of the simple process of rotation there described.

In the latter patent it is also shown that optical axial tipping in the preferred direction, while maintaining the equilateral feature, can be accomplished by weakening the back prism and setting it at a more actue angle to the axis. The front prism however is shown in the preferred examples as remaining in substantially the same position as in the non-optically tipped set first described.

Thus in any of the weaker prism sets obtained by means described in the patents, each prism is at an appreciable inclination from the vertical and takes an appreciable part in the anamorphosis. In some of the still weaker sets shown in this specification, as for instance the sets of magnification 1.20 shown in Fig. 1 the inclination is likewise appreciable and still would be so if inward rotation to produce still weaker sets were carried out in the ranges and manner as described in the Patent 1,931,992. In none of the preferred examples of prism anamorphosers do the individual prisms have positions so nearly vertical as to produce no magnification along an axial ray exterior to the set, that is to say they do not have minimum deviation positions with respect to such rays. (See the well-known minimum deviation formula given in my Patent 1,898,787.) In the preferred examples of all types of prisms shown in the specification and in the patents, and in illustrative modifications thereof, the prisms all lie wholly to one or the other side of a perpendicular to the axis and the exterior faces of the exterior prisms make greater angles with the perpendicular to the axis than one half the sum of the apex and minimum deviation angles of the prism, equality of the angle with this sum meaning no magnification introduced by the said prism along the axis.

Likewise, residual pillow case distortion of three prisms anamorphosers is reduced, in many instances indeed substantially disappears, if the three prism anamorphoser be tipped as a whole so as to make the angle between the front face of the front prism and the axis less than that between said front face and the optical axial plane. The amount of such tipping to accomplish this result, in the case of anamorphosers of magnification constant about 1.45, is 1° to 3°, within certain instances 1½° to 2° optimum.

In Fig. 7 there is shown a three prism objective 121, 122, 123 magnifying 1.45 in which the optical axial plane, as exemplified by the undeviated ray 126 is tipped about 2° with respect to the axis 125 of the objective, and in such direction as to make the angle 130 between the front face of the front prism 123 and the optical axial plane 126 greater than the angle 131 between the same face and the axis 125, thereby to substantially reduce the residual pillow case distortion of ordinary equilateral straight vision three prism objectives.

I have also discovered that the pillow case distortion of projected images of straight vision three prism objectives may be reduced by forming them as if they had been derived from four prism objectives of the type shown in Fig. 5. In fact this would naturally follow from the discovery that three prism objectives can be formed from four prism objectives by substitution of a single prism for the two middle prisms so as not to alter the deviation of oblique and axial rays.

This tipping may be accomplished by tipping an equilateral straight vision objective bodily as a whole or by optically tipping it in the same manner as indicated above for the four prism objective; namely, for example by increasing the strength and angle of inclination to the axis of the front prism, decreasing both for the middle prism.

It is of course understood that these multiple prism anamorphosers can be made achromatic to a very high degree by achromatizing each prism separately.

The foregoing particulars described are illustrative merely and not intended as defining the limits of the invention. It is of course also understood that in order to avoid confusion of terminology with respect to the prism anamorphoser itself the expansion end has been called the front. The prism anamorphoser can of course be turned end for end as a whole to have the opposite anamorposing effect without affecting the improvements constituting the invention.

I claim:

1. An optical system having an optical axis and comprising, in combination, two anamorphosing units, each consisting of two prisms disposed in the form of a V and with their bases oppositely arranged, the base of one and the apex of the other forming the V apex, the adjacent prisms of the two units being inclined in the same direction to the optical axis and having their bases arranged to the same side of the optical axis, the two units having optical axial planes perpendicular to a common active plane, each unit being so constructed and so arranged in respect to strength and inclination of its prisms to the optical axis that the differences in compression between axial pencils and pencils inclined to each side of the optical axis, as arising in the respective units, will tend to counteract each other, thus equalizing the anamorphosis to each side of the optical axis and decreasing distortion.

2. An optical system having an optical axis and comprising, in combination, two anamorphosing units, each consisting of a front and back prism disposed in the form of a V and with their bases oppositely arranged, the base of one and the apex of the other forming the V apex, each prism with its base forward of its apex, the adjacent prisms of the two units being inclined the same way to the optical axis and having their bases arranged to the same side of the optical axis, the two units having optical axial planes perpendicular to a common active plane containing the optical axis of the system.

3. An optical system having an optical axis and comprising two anamorphosing units, each consisting of a front and back prism disposed in the form of a V and with their bases oppositely arranged, the base of one and the apex of the other forming the V apex, each prism having its base forward of its apex, the adjacent prisms of the two units being inclined the same way to the optical axis and their bases arranged to the same side of the axis, each unit being so constructed and so arranged in respect to strength and inclination of its prisms to the optical axis that the axial anamorphosis of the front unit is substantially and sufficiently weaker than that of the back unit so that the difference in compression between axial pencils and pencils inclined to each side of the optical axis is for each unit opposite in character and such that the relative weakness of the front unit tends to compensate for its increased effect, thus neutralizing the differences of the stronger back unit and equalizing the anamorphosis to each side of the optical axis of the objective as a whole and decreasing distortion.

4. A prism anamorphoser comprising at least three prisms in two groups or light deflecting units, the one or first group comprising a front and back prism of roughly equal strengths with bases directed in one and the same direction and each separated by an air space from the other or second deflecting unit, each prism of the first group being inclined so as to take a substantial part in the anamorphosis, and each having with respect to the other or second deflecting unit a substantially different inclination to the axis of the anamorphoser, the front face of the front prism of the first group making an angle with the optical axial plane of the anamorphoser substantially as small as or smaller than the angle between the front face of the back prism and said plane, the second unit lying between the two prisms of the first unit and disposed in the opposite direction thereto, the second unit having a strength substantially greater than either the front or back prism of the first unit, and taking a proportionately greater part in the anamorphosis.

5. A prism anamorphoser consisting of three prisms, separated from each other by air spaces, the base of the center prism being disposed to one side of the optical axial plane and the bases of the front and back prisms to the opposite side thereof, each prism being inclined to the optical axial plane so as to take a substantial part in the anamorphosis, the front face of the front prism making an angle with the optical axial plane substantially as small as or smaller than that of the front face of the back prism with the same plane, the center prism being of a strength approximating the sum of the strengths of the front and back prisms, the front face of the center prism making an angle with the optical axial plane substantially as small as or smaller than the aforementioned angles.

6. An optical system comprising an optical axis and a prism anamorphoser consisting of three prisms separated from each other by air spaces having the base of the centre prism on one side and the bases of the front and back prisms on the opposite side of its optical axial plane, the optical axial plane of the anamorphoser being inclined to the axis of the system at an angle selected to reduce the distortion.

7. A prism anamorphoser consisting of three prisms arranged to have their faces all perpendicular to a common active plane containing the axis of the system of which the front and back prisms are of substantially the same strength and have their bases lying on one side of the axis and the intermediate prism is of substantially twice that strength and has its base lying on the opposite side of the axis, each prism having its base forward of its apex, in which the $\nu$ value of the front prism is less than that of either of the other two prisms.

8. A prism anamorphoser as in claim 7 in which the $\nu$ value of the intermediate prism is intermediate between those of the front and back prisms.

9. An optical system having an optical axis and comprising two anamorphosing units, each unit comprising a front and back prism disposed in the form of a V and with their bases oppositely arranged, the base of one and the apex of the other forming the V apex, the adjacent prisms of the two units being each inclined with its base forward of its apex and to the same side of the optical axis, the two units having optical axial planes perpendicular to a common active plane containing the optical axis of the system, the two units being mounted with their V apices to opposite sides of the optical axis and each unit having its optical axial plane tipped with respect to the optical axis of the system so that the angle between the front face of the front prism of the unit and the optical axial plane is greater than the angle between this prism face and the optical axis, thus to reduce individually and in combination pillow case distortion and in combination inequality of anamorphosis to opposite sides of the optical axis.

10. An optical system including an optical axis and a prism anamorphoser comprising two anamorphosing units, each unit comprising a pair of prisms of different strengths having their bases oppositely arranged and in the form of a V, the stronger prism being toward the front or expansion end of the objective and having its front face inclined to the optical axial plane of the unit at a predetermined angle in one direction, the weaker or back prism having its front face inclined to the optical axial plane of the unit at an angle in the other direction, the prism unit being mounted with its optical axial plane inclined to the optical axis in a direction such that the angle between the optical axial plane and the front face of the front prism is greater than the angle between the optical axis and said front face the V angles of the two units lying on opposite sides of the optical axis and the optical axial planes of the two units being oppositely inclined relative to the said optical axis.

11. An optical system having an optical axis and comprising, in combination, two achromatic straight vision anamorphosing units, each consisting of a front and back achromatized prism disposed in the form of a V and with their bases oppositely arranged, the base of one and the apex of the other forming the V apex, each prism with its base forward of its apex, the adjacent prisms of the two units being inclined the same way to the optical axis and having their bases arranged to the same side of the optical axis, the two units having optical axial planes perpendicular to a common active plane containing the optical axis of the system, in each unit the front prism having its front face inclined to the axis of the objective at a predetermined angle in one direction, the other or back prism having its front face inclined to the optical axis at an angle approximately 4 to 16% greater in the other direction, the strength of the latter prism being approximately 10% less than that of the first mentioned prism, each unit being so constructed and so arranged in respect to strength and inclination of its prisms to the optical axis that the differences in compression between axial pencils and pencils inclined to each side of the optical axis, as arising in the respective units, will tend to counteract each other, thus equalizing the anamorphosis to each side of the optical axis and decreasing distortion.

12. An optical system as in claim 9 in which the tipping of the optical axial plane of the front unit to the optical axis is to the opposite side thereof as compared with that of the back unit and of such amount as to compensate for that of the back unit and thus make a ray parallel to the optical axis entering the first unit exit from the second unit parallel to the optical axis.

13. An optical system having an optical axis and comprising, in combination, two anamorphosing units, each consisting of a front and back prism disposed in the form of a V and with their bases oppositely arranged, the base of one and the apex of the other forming the V apex, each prism with its base forward of its apex, the adjacent prisms of the two units being inclined the same way to the optical axis and having their bases arranged to the same side of the optical axis, and the two units having optical axial planes perpendicular to a common active plane containing the optical axis of the system, in which in one unit the front prism is stronger but not more than 25% stronger than the back prism, the front face of the back prism making an angle with the optical axial plane of the unit which is not more than 12° greater than the angle of the front face of the front prism with this optical axial plane, the latter tipped not more than 7° to the optical axis in such direction as to decrease the angle between the front face of the front prism and the optical axis.

14. An optical system having an optical axis and comprising, in combination, two anamorphosing units, each consisting of a front and back prism disposed in the form of a V and with their bases oppositely arranged, the base of one and the apex of the other forming the V apex, each prism with its base forward of its apex, the adjacent prisms of the two units being inclined the same way to the optical axis and having their bases arranged to the same side of the optical axis, the two units having optical axial planes perpendicular to a common active plane containing the optical axis of the system, in which in one unit the front prism is 25% to 100% stronger than the back prism, the front face of the back prism making an angle with the optical axial plane of the unit which is less but not more than 16° less than the angle of the front face of the front prism with this optical axial plane, the latter tipped not more than 7° to the optical axis in such direction as to decrease the angle between the front face of the front prism and the optical axis.

15. An optical system as in claim 13 in which the tipping of the optical axial plane of the one unit is approximately one degree for each 9% above unity of magnification of the unit.

16. An optical system as in claim 13 in which the Abbé numbers of the two prisms of the one unit differ by not more than six units.

17. A prism anamorphoser comprising two anamorphosing units, each unit comprising a front and a back prism with their bases oppositely arranged in the form of a V the two units being reversely arranged to have their V angles oppositely disposed with respect to an optical axial plane of the respective unit, the two optical axial planes being perpendicular to a common active plane containing the optical axis of the anamorphoser, in each unit the front prism being stronger but not more than 25% stronger and the two prisms tipped in opposite directions so that the front face of the back prism makes an angle with the optical axial plane of the unit which is greater but not more than 12° greater than the angle of the front face of the front prism with the optical axial plane, the two optical axial planes of the two units being similarly tipped with respect to the optical axis by an amount approximately equal to one degree for each 9% of magnification of the unit and in a direction to increase the angle between the front face of the front prism and the optical axis.

18. A prism anamorphoser, as in claim 2, in which the Abbé number of the back prism in each unit has an Abbé number approximately one unit greater than that of the front prism for each 5% of magnification of the unit, and less two-ninths unit for each degree of tipping and 5% of magnification of the unit.

19. A prism anamorphoser consisting of three prisms separated from each other by air spaces, of which the front and back prisms are of substantially the same strength and have their bases lying to one side of the optical axial plane of the anamorphoser and the intermediate prism is of substantially twice that strength and has its base lying on the opposite side of the optical axial plane, the base and apex of each pair of adjacent prisms forming the apex of a V angle, in which the Abbé number of the front prism is less than that of the back prism by an amount approximately equal to one unit for each twentieth above unity of the square root of the magnification constant, the intermediate prism having an intermediate Abbé number.

20. A prism anamorphoser consisting of three prisms separated from each other by air spaces, the base of the center prism being disposed to one side of the optical axial plane and the bases of the front and back prisms to the opposite side thereof, the center prism being of a strength approximating the sum of the strengths of the front and back prisms, each prism inclined to the optical axial plane in anamorphosing position with respect to said plane, each prism thus taking a substantial part in the magnification produced by the anamorphoser, substantially as described.

21. A prism anamorphoser consisting of three prisms separated from each other by air spaces, the base of the center prism being disposed to one side of the optical axial plane and the bases of the front and back prisms to the opposite side thereof, the center prism being of a strength approximating the sum of the strengths of the front and back prisms, the two exterior prisms being positioned with their exterior faces in each case at greater angles to the vertical to the axis than one half the sum of the apex angle and the minimum deviation angles of the prisms, each of the prisms thus taking an appreciable part in the magnification produced by the anamorphoser, substantially as described.

22. A prism anamorphoser consisting of three prisms separated from each other by air spaces, the base of the center prism being disposed to one side of the optical axial plane and the bases of the front and back prisms to the opposite side thereof, the center prism being of a strength approximating the sum of the strengths of the front and back prisms, the exterior prisms each with their exterior faces inclined to the perpendicular to the axis at an angle greater than the apex angle of the prism.

23. A prism anamorphoser comprising at least three prisms in two groups or light deflecting units, the one or first group comprising a front and back prism of roughly equal strengths with bases directed in one and the same direction and each separated by an air space from the other or second deflecting unit, and each having with respect to the other or second deflecting unit a substantially different inclination to the axis of the anamorphoser, the second unit lying between the two prisms of the first unit and disposed in the opposite direction thereto, the second unit having a strength substantially greater than either the front or back prism of the first unit, the two prisms of the first group or unit each with their exterior faces inclined to the perpendicular to the axis at an angle greater than the apex angle of the prism.

24. A prism anamorphoser as in claim 5 in association with an optical system in which the optical axial plane of the anamorphoser is inclined to the axis of the optical system approximately 2 to 5 degrees in a direction such that the angle between the front face of the front prism and the optical axial plane is greater than the angle between this prism face and the axis of the optical system.

25. A prism anamorphoser as in claim 5 in which each of the three prisms is separately achromatized.

HARRY S. NEWCOMER.

CERTIFICATE OF CORRECTION.

Patent No. 2,088,660.                                    August 3, 1937.

HARRY SIDNEY NEWCOMER.

It is hereby certified that error appears in the printed specification of the above numbered patent requiring correction as follows: Page 5, first column, lines 30 to 33 inclusive, in the table, for the numerals "81", "82" and "84" read 81', 82' and 84' respectively; and that the said Letters Patent should be read with these corrections therein that the same may conform to the record of the case in the Patent Office.

Signed and sealed this 19th day of October, A. D. 1937.

Henry Van Arsdale.
(Seal)                                   Acting Commissioner of Patents.